United States Patent [19]
Ejiri et al.

[11] 4,356,555
[45] Oct. 26, 1982

[54] METHOD OF RESTORING A PICTURE CELL BY ESTIMATION WITH HIGH DENSITY

[75] Inventors: Koichi Ejiri, Chiba; Morisumi Kurose, Yokohama; Seiji Hayakawa, Tokyo, all of Japan

[73] Assignee: Ricoh Co., Ltd., Tokyo, Japan

[21] Appl. No.: 175,703

[22] Filed: Aug. 6, 1980

Related U.S. Application Data

[63] Continuation of Ser. No. 20,054, Mar. 13, 1979, abandoned.

[30] Foreign Application Priority Data

Mar. 24, 1978 [JP] Japan .................................. 53-33843

[51] Int. Cl.³ .............................................. H04N 1/40
[52] U.S. Cl. ..................................... 364/515; 358/284
[58] Field of Search ............... 364/515, 518, 520, 526; 358/166, 283, 284, 260; 340/723, 729, 789, 793, 750

[56] References Cited

U.S. PATENT DOCUMENTS

| | | | |
|---|---|---|---|
| 2,962,550 | 11/1960 | Brink | 358/284 |
| 3,739,082 | 6/1973 | Lippel | 358/138 |
| 3,916,096 | 10/1975 | Everett et al. | 358/283 |
| 3,999,047 | 12/1976 | Green | 364/416 |
| 4,127,873 | 11/1978 | Katagi | 358/138 |
| 4,131,883 | 12/1978 | Lundstrom | 364/521 |
| 4,150,400 | 4/1979 | Wong | 358/261 |

OTHER PUBLICATIONS

Appel et al.; "Automatic Filling of Bounded Areas in a Raster Display"; IBM Tech. Discl. Bulletin; vol. 21, No. 3, Aug. 1978; pp. 1300-1303.

Stucki; "Optimal Digital Half Tone Pattern Generation Method"; IBM Tech. Discl. Bulletin; vol. 17, No. 9, Feb. 1975; pp. 2779-2780.

*Primary Examiner*—Errol A. Krass
*Attorney, Agent, or Firm*—Oblon, Fisher, Spivak, McClelland & Maier

[57] ABSTRACT

A picture is divided into equal square picture cells, and the picture cells are sampled in such a manner that the sampled picture cells form a checkered pattern. The density of the non-sampled picture cell is outputted as four data by using the four sampled picture cells surrounding the four sides of the non-sampled picture cell.

3 Claims, 3 Drawing Figures

F I G. 1
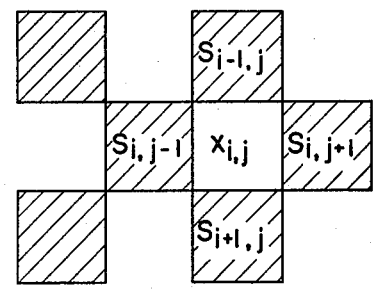
F I G. 2
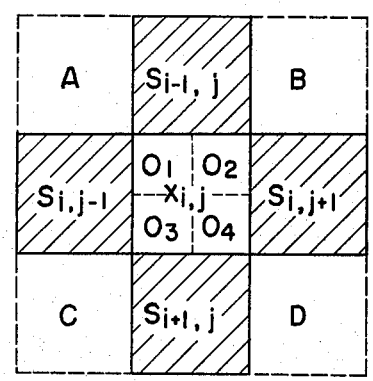

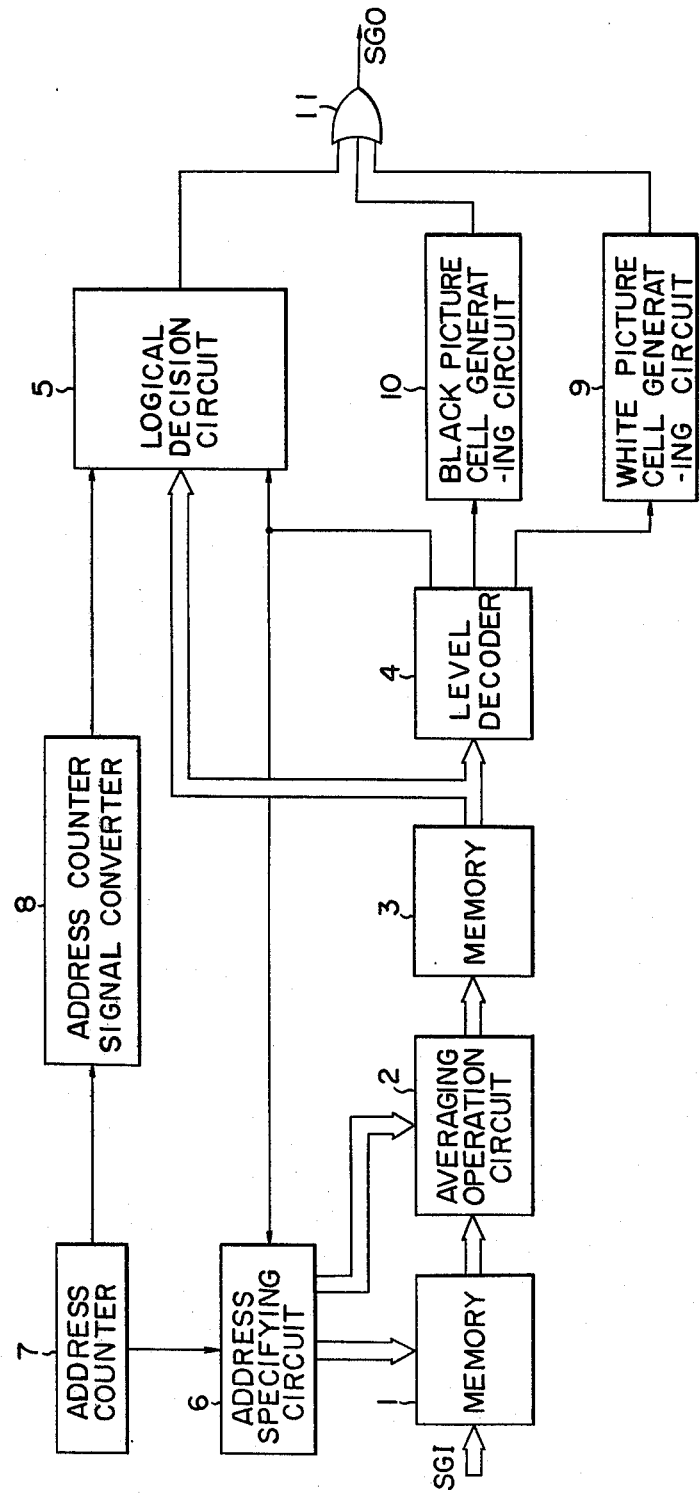
F I G. 3

METHOD OF RESTORING A PICTURE CELL BY ESTIMATION WITH HIGH DENSITY

This is a continuation of application Ser. No. 20,054, filed on Mar. 13, 1979 now abandoned.

BACKGROUND OF THE INVENTION

This invention relates to a method of restoring a picture cell by estimation with high density in which a picture high in density is reproduced by using the sampling data thereof.

A method of restoring a picture by using data obtained from the sampling of that picture is known in the art. In this conventional method, a picture is divided into equal squares, and all of the equal squares are sampled to provide data. In restoring, for instance, a curve indicated white and black by using such data, correction is effected so that the curve is provided as a smooth one.

Furthermore, a method is known in the art in which a picture is divided into equal squares, and the equal squares are sampled as if the sampled equal squares form a checkered pattern. In restoration, the non-sampled picture cell, that is, the picture cell which has not been sampled is estimated from the data of the sampled picture cells adjacent thereto.

However, the former method is still disadvantageous in that since the data of the sampled picture are not subjected to compression, the reduction of transmission cost cannot be expected. In the latter method, the size of the sampling picture cell is equal to that of the restored picture cell, and therefore the density of picture cells cannot be improved; that is, the quality of picture which has been degraded by the reduction of the number of transmission data cannot be improved.

SUMMARY OF THE INVENTION

Accordingly, an object of this invention is to improve a conventional method of restoring a picture.

More specifically, an object of the invention is to provide a method of restoring a picture cell by estimation with high density, in which data transmission is effected with high efficiency and the quality of the picture is improved.

The principle, nature and utility of this invention will become more apparent from the following detailed description when read in conjunction with the accompanying drawing.

BRIEF DESCRIPTION OF THE DRAWING

In the accompanying drawing:

FIG. 1 is an explanatory diagram showing the states of sampled picture cells;

FIG. 2 is an explanatory diagram for a description of a method of restoring a picture cell by estimation according to the invention; and FIG. 3 is a block diagram showing a picture cell restoring device for practicing the method of restoring a picture cell by estimation according to the invention.

DETAILED DESCRIPTION OF THE INVENTION

FIG. 1 shows the states of sampled picture cells in this invention. In FIG. 1, the shadowed portions are sampled picture cells S, and the unshadowed portion is a non-sampled picture cell X, the suffixes "i" and "j" designating the addresses of the picture cells.

The sampling of a picture is effected as shown in FIG. 1, and the sampled data are transmitted to a data receiving where the non-sampled picture cell $X_{i,j}$ is restored by estimation from the four adjacent picture cells $S_{i-1,j}$, $S_{i,j-1}$, $S_{i+1,j}$ and $S_{i,j+1}$. In this case, the non-sampled picture cell $X_{i,j}$ is regarded as an assembly of four equal square sub-cells $O_1$, $O_2$, $O_3$ and $O_4$, which are respectively estimated. The algorithm of this estimation will be described.

It is natural that, in the case of estimating the non-sampled picture cell $X_{i,j}$ from the eight adjacent picture cells A, B, C, D, $S_{i-1,j}$, $S_{i,j-1}$, $S_{i,j+1}$ and $S_{i+1,j}$, there is a relation therebetween as indicated by the following equation (1):

$$X_{i,j} = K_1 A + K_2 B + K_3 C + K_4 D + l_1 S_{i-1,j} + l_2 S_{i,j-1} + l_3 S_{i,j+1} + l_4 S_{i+1,j} \quad (1)$$

where $K_1$ through $K_4$, and $l_1$ through $l_4$ are the estimation coefficients of the respective picture cells, and A, B, C, D, $S_{i-1,j}$, $S_{i,j-1}$, $S_{i,j+1}$ and $S_{i+1,j}$ are the density data of the respective picture cells.

In order to investigate the relations between the estimation coefficients $K_1$ through $K_4$ and $l_1$ through $l_4$, in the equation (1), experiments for the estimation coefficients $K_i$ and $l_i$ of various pictures have been done. As a result, it has been found that the estimation coefficients can be approximated by the values indicated in the following equation (2) for both Japanese and European languages if the pictures are of a sentence pattern:

$$K_1 \cong K_2 \cong K_3 \cong K_4 \cong -0.25 \quad (2)$$
$$l_1 \cong l_2 \cong l_3 \cong l_4 \cong 0.5$$

The following equation (3) is obtained by applying the results of the equation (2) to the equation (1):

$$X_{i,j} = l_1 S_{i-1,j} + l_2 S_{i,j-1} + l_3 S_{i,j+1} + l_4 S_{i+1,j} \quad (3)$$
$$l_1 \cong l_2 \cong l_3 \cong l_4 \cong 0.25$$

The non-sampled picture cell $X_{i,j}$ is estimated by the utilization of the equation (3).

Then, the estimation value of the non-sampled picture cell $X_{i,j}$ is assumed to be $SQ(X_{i,j})$. Under this condition, the value between the data representing the blackest and the data representing the whitest is divided into five values, and it is detected which of the five values is occupied by the estimation value $SQ(X_{i,j})$. For simplification in description, it is assumed that all of the sampling data are within the range of one (1) to zero (0), and that as the value becomes closer to one (1), the data represents more black, and similarly as the value becomes closer to zero (0), the data represents more white. The four equal sub-cells $O_1$, $O_2$, $O_3$ and $O_4$ are estimated, as indicated by the following equations (4) through (8) by the classification of the estimation value $SQ(X_{i,j})$:

(a) When $0 \leq SQ(X_{i,j}) < 1/5$, $$O_1 = O_2 = O_3 = O_4 = O \text{ (white)} \quad (4)$$

(b) When $1/5 \leq SQ(X_{i,j}) \leq 2/5$, $$O_k = 1 \text{ (black)} \quad (5)$$

-continued $$O_l = O_m = O_n = 0 \text{ (white)}$$

(c) When $2/5 \leq SQ(X_{i,j}) \leq 3/5$, $$O_k = O_l = 1 \text{ (black)} \tag{6}$$

$$O_m = O_n = 0 \text{ (white)}$$

(d) When $3/5 \leq SQ(X_{i,j}) \leq 4/5$, $$O_k = O_l = O_m = 1 \text{ (black)} \tag{7}$$

$$O_n = 0 \text{ (white)}$$

(e) When $4/5 \leq SQ(X_{i,j}) \leq 1$, $$O_k = O_l = O_m = O_n = 1 \text{ (black)} \tag{8}$$

The suffixes k, l, m and n have the following relations: The density data of the sampled picture cells S are used to calculate the following equation (9):

$$T_1 = S_{i-1,j} + S_{i,j-1} \tag{9}$$

$$T_2 = S_{i-1,j} + S_{i,j+1}$$

$$T_3 = S_{i,j-1} + S_{i+1,j}$$

$$T_4 = S_{i,j+1} + S_{i+1,j}$$

When the values $T_1$ through $T_4$ are arranged in the order of magnitude, beginning with the closest to one (1), the suffixes k through n correspond respectively to the suffixes 1 through 4 of the values T. For instance, with $T_1=0.33$, $T_2=0.17$, $T_3=0.86$ and $T_4=0.54$, the following relation (10) is established, and $k=3$, $l=4$, $m=1$ and $n=2$.

$$T_3 \geq T_4 \geq T_1 \geq T_2 \tag{10}$$

The estimation of the non-sampled picture cell $X_{i,j}$ is carried out as described above. Then, after the address of the picture cell is shifted, the same operation is carried out.

FIG. 3 is a block diagram showing a picture cell restoring device for practicing the method of restoring a picture cell by estimation with high density according to the invention.

In this device, a sampling signal SG from a scanner is stored in a memory 1. Then, the density of a non-sampled picture cell X is estimated by an averaging operation circuit 2. In this case, the combination of the address (i, j) of the picture cell is determined by signals from an address counter 7 and an address specifying circuit 6. The operation of determining the states of the four equal sub-cells $O_1$ through $O_4$ from the obtained picture cell data according to the above-described method is carried out in a logical decision circuit 5. The result of decision of the logical decision circuit 5 and signals from a white picture cell generating circuit 9 and a black picture cell generating circuit 10 are applied to an OR circuit 11, from which a signal SGO is applied to a plotter buffer.

The device further comprises: an address counter signal converter circuit 8 for relaying the signal from the address counter 7 to the logical decision circuit 5; and a level decoder 4 for determining the level of the estimation value $SQ(X_{i,j})$ of the non-sampled picture cell X.

As is apparent from the above description, according to the invention, a picture which is high in picture cell density and is high in picture quality can be obtained from a relatively small number of sampling data, thus eliminating the drawbacks accompanying the conventional method.

What is claimed is:

1. In a method of forming an image of a picture divided into plural equal square picture cells, wherein data compression is employed by sampling only selected of said cells in a checkered pattern in which each non-sampled cell is surrounded above, below and on both sides thereof by adjacent sampled picture cells, and said image is formed based on said sampled cells, the improvement comprising:

generating sampled data indicative of the light density of each of said sampled picture cells adjacent each non-sampled picture cell;

dividing each non-sampled cell into four separate sub-cells;

firstly determining how many of said sub-cells of each non-sampled cell are to be assigned a first predetermined light density and how many thereof are to be assigned a second predetermined light density based on the generated sampled light density data indicative of the light density of said adjacent sampled picture cells;

secondly determining which of said sub-cells are to be assigned said first predetermined light density and said second predetermined light density based on relative comparisons of the light density of predetermined sub-combinations of the sampled data of said adjacent sampled picture cells;

generating restored data based on said steps of firstly determining and secondly determining, said restored data defining which of said sub-cells of each non-sampled picture cell have assigned thereto said first predetermined light density and which have assigned thereto said second predetermined light density; and reproducing said image of said picture based on the sampled data indicative of the light density of said sampled picture cells and the restored data indicative of the light density of each sub-cell of each non-sampled picture cell.

2. A method as claimed in claim 1, in which said non-sampled picture cell is restored by estimation according to the following expressions:

$$X_{i,j} = l_1 S_{i-1,j} + l_2 S_{i,j-1} + l_3 S_{i,j+1} + l_4 S_{i+1,j}$$

$$l_1 \simeq l_2 \simeq l_3 \simeq l_4 \simeq 0.25$$

where $S_{i-1,j}$, $S_{i,j-1}$, $S_{i,j+1}$ and $S_{i+1,j}$ are the density data of said four adjacent sampled picture cells, and $l_1$, $l_2$, $l_3$ and $l_4$ are the estimation coefficients of the same, respectively.

3. A method as claimed in claim 2, in which said non-sampled picture cell ($X_{i,j}$) is divided into four equal square picture sub-cells ($O_1$, $O_2$, $O_3$ and $O_4$), and said four equal square picture sub-cells ($O_1$ through $O_4$) are estimated according to the following equations (a) through (e) by classifying the estimation value ($SQ(X_{i,j})$) of said non-sampled picture cell:

(a) when $0 \leq SQ(X_{i,j}) \leq 1/5$, $O_1 = O_2 = O_3 = O_4 = 0$ (white)

(b) when $1/5 \leq SQ(X_{i,j}) \leq 2/5$, $O_k = 1$ (black)

$O_l = O_m = O_n = 0$ (white)

(c) when $2/5 \leq SQ(X_{i,j}) \leq 3/5$, $O_k = O_l = 1$ (black)

$O_m = O_n = 0$ (white)

(d) when $3/5 \leq SQ(X_{i,j}) \leq 4/5$, $O_k = O_l = O_m = 1$ (black)

-continued $O_n = 0$ (white)

(e) when $4/5 \leq SQ(X_{i,j}) \leq 1$, $O_k = O_l = O_m = O_n = 1$ (black)

where said suffixes k, l, m and n correspond respectively to the suffix numerals 1, 2, 3 and 4 of values $T_1$, $T_2$, $T_3$ and $T_4$ which are obtained from calculation of the following equations and are arranged in the order of magnitude:

$T_1 = S_{i-1,j} + S_{i,j-1}$ $T_2 = S_{i-1,j} + S_{i,j+1}$ $T_3 = S_{i,j-1} + S_{i+1,j}$ $T_4 = S_{i,j+1} + S_{i+1,j}$.

* * * * *